United States Patent [19]
Karwath

[11] Patent Number: 6,008,602
[45] Date of Patent: Dec. 28, 1999

[54] ARRANGEMENT WITH AN ELECTRONICALLY COMMUTATED MOTOR

[75] Inventor: Arno Karwath, Rottweil, Germany

[73] Assignee: Papst-Motoren GmbH & Co. KG, St. Georgen, Germany

[21] Appl. No.: 09/125,156

[22] PCT Filed: Jun. 3, 1997

[86] PCT No.: PCT/EP97/02878

§ 371 Date: Aug. 13, 1998

§ 102(e) Date: Aug. 13, 1998

[87] PCT Pub. No.: WO97/48177

PCT Pub. Date: Dec. 18, 1997

[30] Foreign Application Priority Data

Jun. 7, 1996 [DE] Germany ............ 29 6 10 084 U

[51] Int. Cl.$^6$ .................................................. H02K 23/00
[52] U.S. Cl. ........................ 318/254; 318/138; 318/439
[58] Field of Search ............................... 318/254, 138, 318/439

[56] References Cited

U.S. PATENT DOCUMENTS

| | | | |
|---|---|---|---|
| 4,445,167 | 4/1984 | Okado | 363/56 |
| 4,583,028 | 4/1986 | Angersbach et al. | 318/254 |
| 4,642,475 | 2/1987 | Fischer | 307/66 |
| 4,879,475 | 11/1989 | Rüge | 307/68 |
| 5,220,258 | 6/1993 | Hans | 318/254 |

(List continued on next page.)

FOREIGN PATENT DOCUMENTS 0 318 938 A2  6/1989  European Pat. Off. .
0 467 085 A1  1/1992  European Pat. Off. .

(List continued on next page.)

OTHER PUBLICATIONS

WPI English Abstract of Fischer/Siemens DE 32 09 939–A1 & EP 089 544, of Sep. 28–29 '83.
WPI English Abstract of Fischer+/Siemens DE 34 19 420–A1, of Nov. 20, '85.
WPI English Abstract of Rüge, Kathke et al. DE 36 33 627–C2 of Apr. 14, '88.
WPI English Abstract of Dragotin DE 36 42 249–A1, of Jun. 23, '88.
Schiftner, "Antriebssysteme für die Traktion," in *ELIN–Zeitschrift*, vol. 1–2, 1990, pp. 7–20.
WPI English abstract of Hans+Moini/Papst DE 40 19 338 (Dec. 19, '91) & EP 0 467 085–A1 (Jan. 22, '92).
WPI English abstract of Karwath+Moini/Papst DE 42 23 208–A1 of Jan. 20, '94.
WPI English Abstract of Rottmerhusen DE 43 05 767–A1 of Sep. 1, '94.
WPI English Abstract of Lory, Huegel & Kuenzel/Siemens DE 43 06 307–A, of Sep. 8, 1994.

(List continued on next page.)

*Primary Examiner*—Karen Masih
*Attorney, Agent, or Firm*—Milton Oliver Ware, Fressola Van Der Sluys & Adolphson LLP

[57] ABSTRACT

An arrangement with a electronically commutated motor (10) with a permanent-magnet rotor (14) is supplied with DC power from an AC supply (28, 30) via a rectifier (44) connected thereto and a DC link (46,52) connected to said rectifier (44). It has an arrangement (60, 64, 66, 68, 70) powered from the AC system for supplying power to the electronic control circuit (16, 18) of the motor (10), supplying a DC voltage at its output which is lower than that on the DC link (46, 52). To the latter is connected a series controller (76) for alternative power supply to the electronic control unit (16, 18) of the motor (10) which contains a control transistor (78) operating as a variable resistor which, at normal voltage, is blocked at said output (72, 46) and is activated when the voltage is excessively low, so that the electronic control unit (16, 18) can be powered from the DC link (46, 52).

19 Claims, 3 Drawing Sheets

U.S. PATENT DOCUMENTS

| | | | |
|---|---|---|---|
| 5,287,288 | 2/1994 | Brennen et al. | 318/254 |
| 5,343,129 | 8/1994 | Hans | 318/431 |
| 5,384,696 | 1/1995 | Moran et al. | 318/254 |
| 5,589,745 | 12/1996 | Hans | 318/431 |
| 5,598,073 | 1/1997 | Hans | 318/431 |
| 5,600,216 | 2/1997 | Karwath | 318/291 |
| 5,710,494 | 1/1998 | Paweletz | 318/366 |

FOREIGN PATENT DOCUMENTS

| | | |
|---|---|---|
| 0 685 925 A1 | 12/1995 | European Pat. Off. . |
| 32 36 692 C2 | 4/1983 | Germany . |
| 31 45 232 A1 | 6/1983 | Germany . |
| 32 09 939 A1 | 9/1983 | Germany . |
| 34 19 420 A1 | 11/1985 | Germany . |
| 36 33 627 C2 | 4/1988 | Germany . |
| 36 42 249 A1 | 6/1988 | Germany . |
| 42 23 208 A1 | 1/1994 | Germany . |
| 43 05 767 A1 | 9/1994 | Germany . |
| 43 06 307 A1 | 9/1994 | Germany . |
| 44 21 406 A1 | 12/1995 | Germany . |

OTHER PUBLICATIONS

Joachim Holtz et al., "Controlled AC Drives with Ride–Through Capability at Power Interruption," in *IEEE Transactions on Industry Applications,* vol. 30, No. 5, Sep./Oct. 1994, pp. 1275–1283.

P. Arnold, "Platz sparend mit Gleichspannungsschiene," in *Drive & Control,* Feb. '95, pp. 8–10.

WPI English Abstract of Stillhard/Vickers Inc. EP 0 685 925–A1 of Dec. 6, '95.

WPI English Abstract of Paweletz/SKF De 44 21 406–A1 of Dec. 21, '95.

ARRANGEMENT WITH AN ELECTRONICALLY COMMUTATED MOTOR

FIELD OF THE INVENTION

The invention relates to an arrangement comprising an electronically commutated motor having a permanent magnet rotor and which is, in operation, supplied with a DC voltage from an alternating current (AC) main by way of a rectifier connected to this main and by way of a DC link connected to this rectifier.

BACKGROUND

Motors of this kind have been disclosed by EP 0 467 085 A1, Hans et al. or DE-UM 9 414 498.2. In these motors, their electronics must be supplied, via a separate power supply from the AC main, with a suitable low voltage, e.g. a DC voltage of 5 or 12 V.

From this, the problem arises that, upon a short interruption of the main voltage or after an electronically commutated motor of this kind is switched off, its electronics quickly are rendered currentless and therefore can assume erratic switching states, while the motor itself continues to rotate and thus feeds energy back into the DC link. This can lead to the destruction of electronic components of the motor, particularly in motors that are supplied with current via a full bridge circuit.

It is, therefore, one object of the invention to provide a new arrangement with an electronically commutated motor.

SUMMARY OF THE INVENTION

According to the invention, this object is accomplished by providing an alternative power source to the electronic control circuit and adding diodes in the full bridge circuit. One thus obtains that, directly after the motor is switched on, as well as after the motor is switched off, or after a current failure, the electronic circuits of the motor are supplied with energy from the DC link via a series controller, so that the commutation of the motor is reliably assured down to low speeds and the motor comes to a stop with no trouble. The series controller is only activated when the voltage at said output mentioned is no longer high enough, so that unnecessary electrical losses in the series controller are prevented, and a favorable efficiency of the motor results.

BRIEF FIGURE DESCRIPTION

Other details and advantageous improvements of the invention ensue from the exemplary embodiments, which are described below, are represented in the drawings, and are in no way to be understood as a limitation of the invention, as well as from the remaining subclaims.

FIG. 1 shows a block circuit diagram of an arrangement according to the invention, FIG. 2 is a depiction analogous to FIG. 1, but with additional details of the circuit, and FIG. 3 is a depiction of an electronically commutated motor that is operated by means of a full bridge circuit (H-bridge).

DETAILED DESCRIPTION

Figure 1:
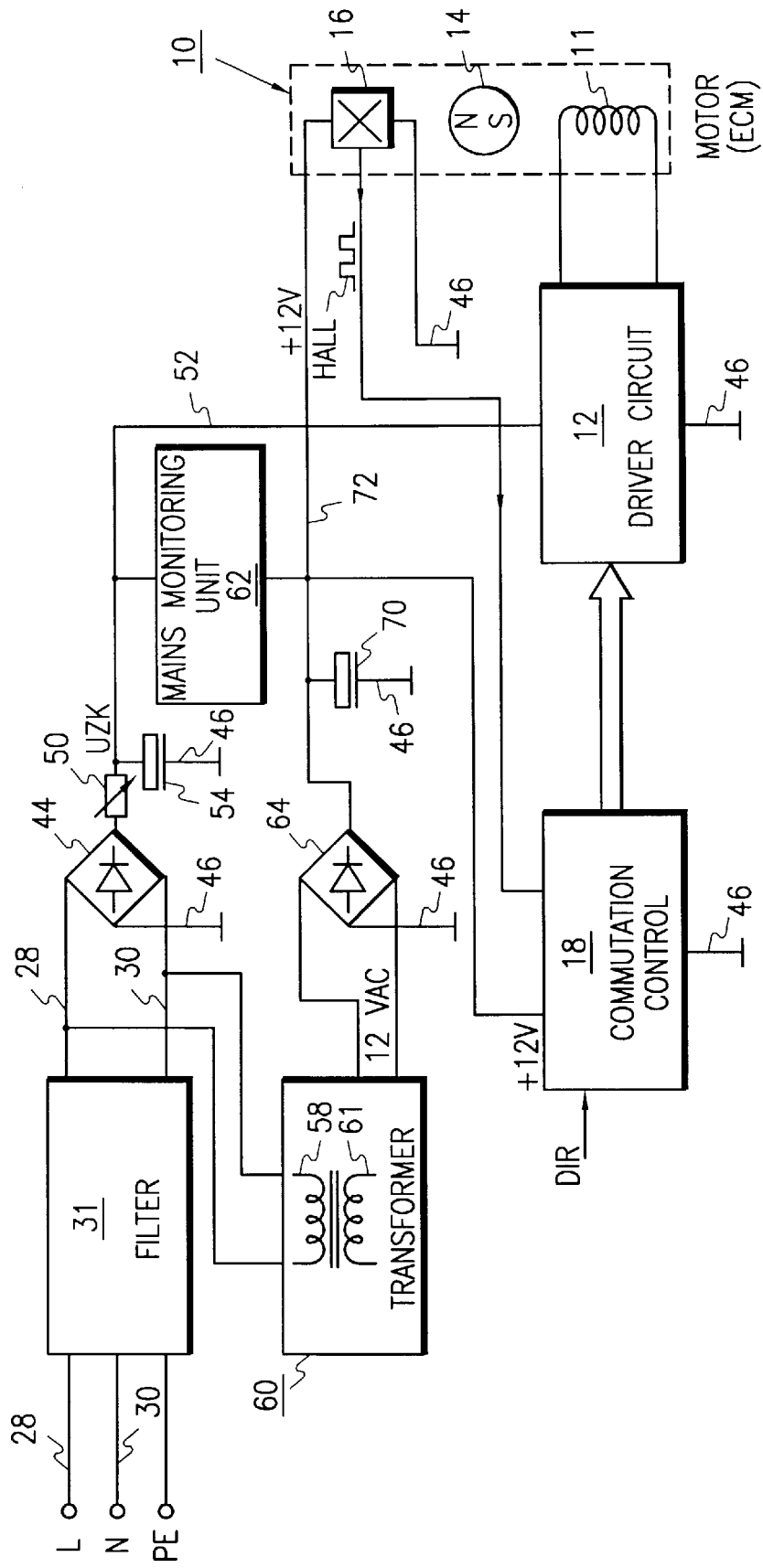

FIG. 1 shows an arrangement according to the invention in the form of a block circuit diagram. This includes an electronically commutated motor (ECM) 10, which is represented here with a single winding phase or strand 11 and is supplied with current by way of a power output stage 12 (full bridge circuit, see FIG. 3). The motor 10 has a permanent magnet rotor 14, which is schematically represented here as a two-pole rotor, and in whose vicinity is located a rotor position sensor 16, usually a Hall generator (Hall IC). The rotor position sensor 16 is supplied with a low DC voltage of, for example, 12 V, and then supplies a digital output signal Hall to a commutation control unit 18. This unit likewise requires, for its operation, this low DC voltage of, for example, 12 V. The commutation control unit 18 can, for example, be supplied with a signal DIR that controls the rotation direction of the motor 10 and according to FIG. 3, the unit can emit a signal at its output 20, with which it interrupts the current supply of the motor 10 by way of two AND gates 22, 24 in order, for example, to control the speed of the motor or to limit its current.

The arrangement depicted in FIG. 1 is supplied with current from an alternating current (utility) main, to which it can be connected by means of two connections 28, 30. A ground connection of the alternating current main is designated PE. The connection is carried out via a filter 31. According to FIG. 2, this includes a fuse 32, a choke 34, a filter capacitor 36, a second choke 88, and a filter capacitor 40. A rectifier bridge 44 is connected between the lines 28 and 30 in the manner depicted. Its negative output 46 is connected to ground (GND) and its positive output 48 is connected by way of a Negative Coefficient of Temperature (NCT) resistor 50 to an intermediate-circuit line (d.c. link) 52 by way of which the motor 10 is directly supplied with a pulsating direct current voltage of, for example, +320 V, in the event that the alternating current voltage between the lines 28 and 30 is 220 V. Naturally, this voltage can also be lower, e.g. 117 V, and then the pulsating direct current voltage likewise has a lower value. A capacitor 54 is connected between ground 46 and the intermediate-circuit line 52, in order to smooth the DC voltage present there. The NTC resistor 50 limits the starting current.

Figure 2:
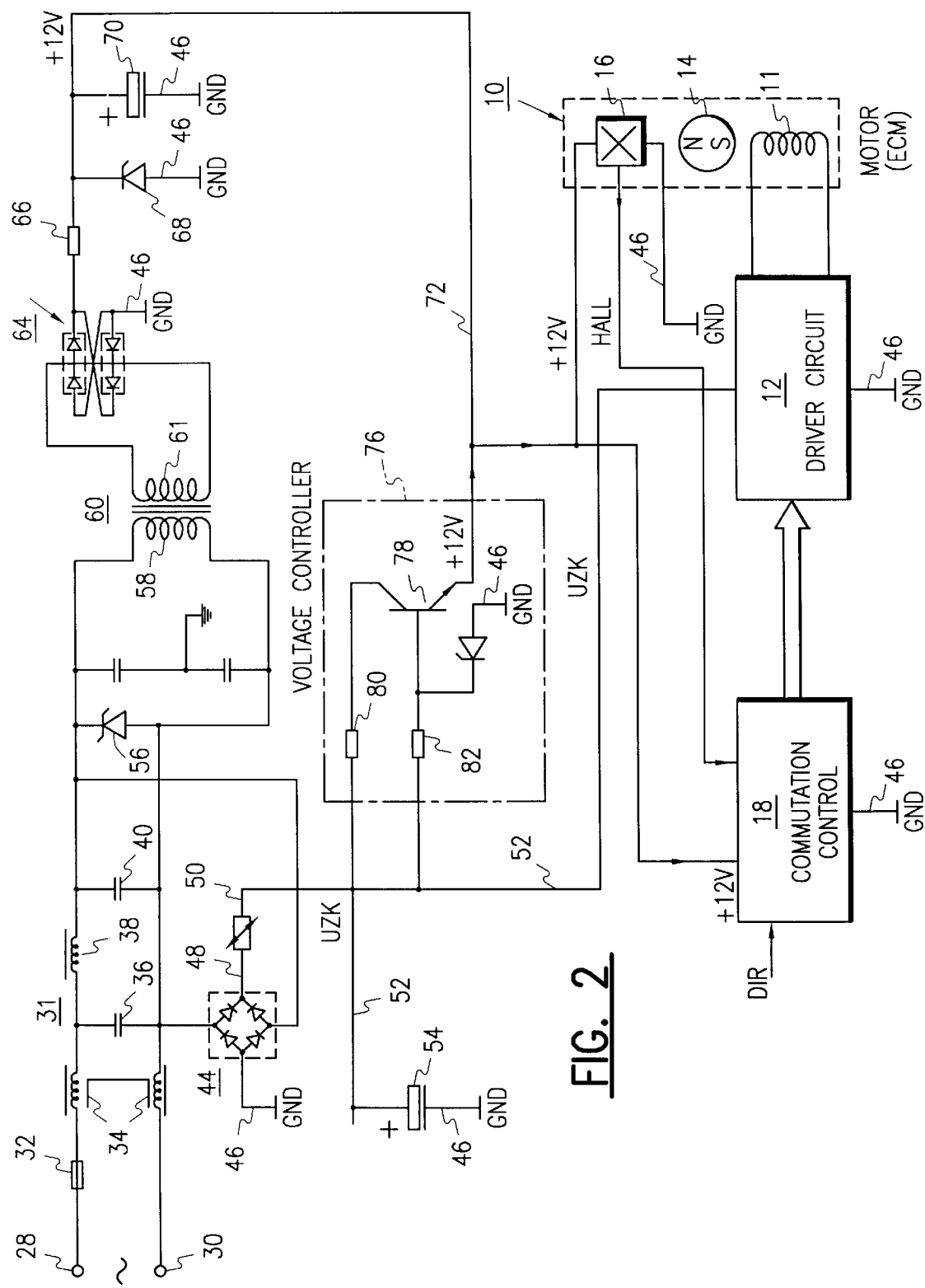

According to FIG. 2, a varistor 56 serves to limit overvoltages between the lines 28 and 30. The AC voltage is also supplied to the primary winding 58 of a transformer 60, whose secondary winding 61 supplies a voltage of, for example, 12 V, which is rectified by means of a rectifier bridge 64. This DC voltage is kept constant at 12 V by way of a resistor 66 and a Zener diode 68 (FIG. 2) and, as shown, is filtered by means of a capacitor 70. The DC voltage of 12 V, for example, is therefore present between a line 72 and ground 46 (GND). The line 72 is connected to the sensor 16 and the commutation circuit 18 and supplies both with low voltage.

A mains monitoring unit is designated 62, and monitors the voltage $U_{ZK}$ in the line 52 and the DC voltage (e.g. +12 V) in the line 72. The reason for this is as follows: when the arrangement shown in FIG. 1 is switched on, i.e. when the mains voltage is supplied to the terminals 28 and 30, the voltage $U_{ZK}$ (on the line 52) increases very rapidly, whereas it takes longer for the DC voltage in the line 72 to build up, which supplies the Hall generator 16 and the commutation control unit 18 with energy.

As a result, without the mains monitoring unit 62, the switching state of the power output stage 12 would not be unambiguously defined. Since preferably, the power output stage 12 is a full bridge circuit, see FIG. 3, this switching state, that is not unambiguously defined, could lead to a short circuit in this bridge.

An analogous problem arises when the arrangement depicted is disconnected from the main. Here, too, the DC voltage on the line 72 goes to zero faster than the voltage $U_{ZK}$ on the line 52, since upon being switched off, the rotor 14 continues to rotate and to supply generator energy back to the DC link 46, 52 until the rotor 14 comes to a halt. For this reason, $U_{ZK}$ decreases in proportion to the speed of the motor 10, and in this instance as well, without the mains monitoring unit 62, a short circuit can occur in the full bridge circuit (in the power output stage 12) or an overvoltage can occur in the power output stage 12, which jeopardizes it as well.

The mains monitoring unit 62 therefore detects the voltage $U_{ZK}$ on the line 52 and the voltage on the line 72. If the latter becomes too low and $U_{ZK}$ is above a predetermined value, the mains monitoring unit 62 causes the line 72 to be supplied with an alternative DC voltage, e.g. from a battery (not shown) provided for this, or via a voltage controller 76 from the line 52. This is shown in FIG. 2 and will be described below.

In this manner, the commutation of the motor 10 is assured by means of the commutation control unit 18 directly after switching on, as well as after switching off, until the rotor 14 comes to a halt.

In addition to the transformer 60 and rectifier 64, according to FIG. 2, a second low voltage current supply 76 is provided, which is connected to the DC link 52. It is preferably formed as a so-called "series controller" and for this, includes an n-p-n control transistor 78, whose collector is connected to the intermediate-circuit line 52 by way of a resistor 80. Its emitter is connected directly to the line 72. Its base is connected to line 52 by way of a resistor 82 and is connected to ground (GND) by way of a Zener diode 83 (e.g. 8.1 V). Since the Zener voltage of 8.1 V is considerably lower than the DC voltage of 12 V, which is present on the line 72 during operation, the control transistor 78 remains blocked during normal operation of the motor 10, so that no losses are produced in it and the resistor 80. The transistor 78 functions as an emitter follower.

If the arrangement depicted in FIGS. 1 and 2 is disconnected from the AC main so that the voltage on the line 72 falls below 8.1 V, then the control transistor 78 becomes conductive, and line 72 is now supplied with current from the intermediate-circuit line 52 by way of the resistor 80 and the transistor 78, so that, even in this instance, the sensor 16 and the commutation control unit 18 are supplied with current from the intermediate-circuit line 52 as long as the rotor 14 is turning and the motor 10, which is now functioning as a generator, supplies the intermediate-circuit line 52 with current.

This has the advantage that directly after the motor 10 is switched on, as well as after it is switched off, the switching states of the bridge circuit 12 are always unambiguously defined, as long as a direct current voltage is present on the intermediate-circuit line 52. Since the transistor 78 and the resistor 80 are only loaded for a short time, namely directly after the motor 10 is switched on (as long as the voltage on the line 72 has not yet reached the desired level) and after the motor is switched off until the point at which the rotor 14 comes to a halt, these components only have to be designed for short-term loading and do not impair the efficiency of the motor.

Figure 3:
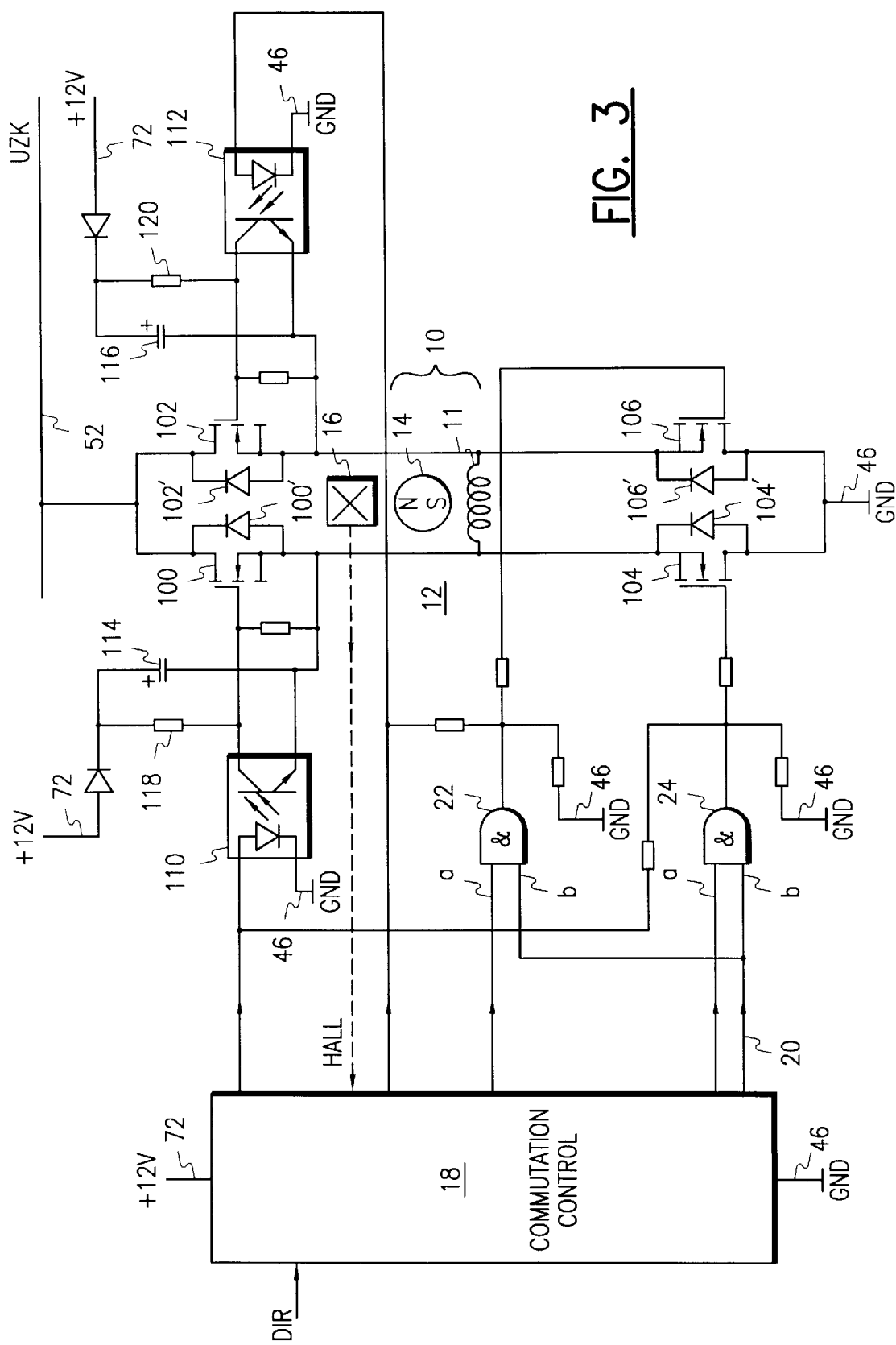

By way of example, FIG. 3 shows a full bridge circuit 12 with four N-channel MOSFET transistors 100, 102, 104, and 106 in the form of an H-bridge. These transistors are each connected in antiparallel to recovery diodes 100' to 106' in the manner shown. The single phase or strand 11 of the motor 10 is disposed in the diagonal of the H-bridge 12. Naturally, the invention is suited in the same manner for motors with a plurality of phases, e.g. for three-phase motors with a corresponding full bridge circuit, wherein a larger number of Hall generators must then be used. In a single-phase, two-pulse motor (as shown), a single Hall generator 16 suffices, which is only schematically represented in FIG. 3 and is controlled by the magnetic field of the rotor magnet 14.

The H-bridge 12 is disposed between the line 52 (e.g. +320 V) and ground 46 (GND). The bridge 12 would be destroyed if the transistors 100 and 104 or the transistors 102 and 106 were switched on simultaneously. In order to prevent this, the commutation control unit 18 must be continuously supplied with an operating voltage via the line 72 as long as a positive voltage is present on the intermediate-circuit line 52, so that only the transistors 100 and 106 or 102 and 104 can be switched on at the same time, and the other transistor pair is respectively switched off.

Opto-couplers 110 and 112, respectively, are used to control the upper bridge transistors 100, 102. If one of these opto-couplers receives, at its input, a current from the commutation control unit 18, the diode in it excites or radiates and makes the transistor at its output conductive, so that the gate of the relevant MOSFET receives a low potential, and this MOSFET shuts off. If the opto-coupler does not receive a current at its input, then the associated MOSFET 100 or 102 becomes conductive because its gate receives a corresponding signal by way of the associated capacitor 114 or 116 and the associated resistor 118 or 120, and this signal makes it conductive.

The two lower MOSFETs 104, 106 are controlled by way of the AND gates 24 and 22, respectively. When the output of the AND gate 24 is low, the MOSFET 104 is switched off. The same is true for the AND gate 22 and the MOSFET 106.

The AND gates 22, 24 each have two inputs a and b. Only when both inputs have the potential H (=high), is the output also high, and the relevant MOSFET is switched into a conductive state, i.e. is switched on.

Both AND gates 22, 24 can be simultaneously switched to a low signal at their output by means of a low signal from the output 20 of the commutation control unit 18, by means of which both MOSFETs 104, 106 are switched off at the same time and the motor 10 is switched to a currentless state. In this manner, the speed, for example, can be controlled or the motor current can be limited to a maximal value.

After the motor 10 is switched off, it supplies energy back to the intermediate-circuit line 52 by way of the recovery diodes 100', 102', 104', and 106' so that a voltage $U_{ZK}$ is maintained there, which decreases as the speed of the motor 10 falls. By way of the series controller 76, this voltage supplies the electronics of the motor 10 with voltage, as long as this motor is still rotating, so that the MOSFETs 100, 102, 104, 106 are correctly controlled in this instance, too, and a short circuit cannot occur in the bridge 12. The same is true when switching on the motor 10 until the operating voltage of e.g. +12 V is built up on the line 72 by way of rectifier 64.

For the power supply 76, one may use any circuit that produces a low DC voltage from a high DC voltage. The depicted circuit, with a series controller transistor 78, is very simple and has the advantage that at the same time, it also assumes the function of the voltage monitoring unit 62 (FIG. 1), i.e. it switches off automatically during normal operation, and only becomes active for a short time while the motor 10 is being switched on or off. A transistor which tolerates high voltages must be used for the control transistor 78.

Naturally, many alterations and modifications are possible within the scope of the present invention.

What is claimed is:

1. An arrangement comprising
an electronically commutated motor (10), having
a permanent magnet rotor (14),
at least one stator winding (11),
and an electronic control circuit (16, 18), and being supplied, in operation with a DC voltage from an AC utility main (28, 30) via a rectifier (44) connected to said main, and via a DC link (46, 52) connected to this rectifier, said DC link supplying power to said at least one stator winding (11);
a power supply circuit (60, 64, 66, 68, 70) supplied with current from the AC main for supplying current to the electronic circuit (16, 18) of the motor (10), and which supplies a DC voltage at its output (72, 46) that is lower than voltage on the DC link (46, 52), including
a series controller (76) connected to the DC link for alternatively supplying current to the electronic circuit (16, 18) of the motor (10), which series controller (76) has a control transistor (78) operated as a variable resistor that is blocked when there is a normal voltage at said output (72, 46) and is activated when said voltage is too low, in order to provide energy supply to said electronic circuit (16, 18) from the DC link (46, 52).

2. The arrangement according to claim 1, wherein
the power supply circuit for supplying the electronic circuit (16, 18) of the motor (10) comprises a transformer (60) that isolates said power supply circuit from the alternating current main (28, 30).

3. The arrangement according to claim 2, wherein
the output voltage of the series controller (76) during operation is lower than the output voltage of the power supply circuit (64, 66, 68, 70) supplied via the transformer (60).

4. The arrangement according to claim 2, wherein
the control transistor (78) of the series controller (76) is switched off as a result of a difference between its base potential and its emitter potential that occurs when energy is being supplied from the AC main (28, 30),
the emitter of said transistor being connected to an output (72) of the arrangement supplied via the transformer (60) and its base being kept at a constant reference potential (83).

5. The arrangement according to claim 1,
wherein the DC link (46, 52) and the low voltage at the output (46, 72) of said power supply circuit have a common ground potential (46).

6. The arrangement according to claim 1, further comprising:
a semiconductor full bridge circuit (12) interconnecting an output of said DC link (52, 46) and said at least one winding (11) of the electronically commutated motor (10).

7. The arrangement according to claim 6, wherein
the semiconductor full bridge circuit (12) comprises MOSFETs (100, 102, 104, 106) as power semiconductors.

8. The arrangement according to claim 6,
further comprising opto-couplers which control semiconductor switches (100, 102) disposed on a high-voltage side of the full bridge circuit (12).

9. The arrangement according to claim 6, further comprising
recovery diodes (100', 102', 104', 106') which are connected in antiparallel to semiconductor switches (100, 102, 104, 106) of the full bridge circuit (12), in order to permit operation of the motor (10) as a generator.

10. The arrangement according to claim 2,
in which the DC link (46, 52) and the low voltage at the output (46, 72) of the power supply circuit have a common ground potential (46).

11. The arrangement according to claim 3,
in which the DC link (46, 52) and the low voltage at the output (46, 72) of the power supply circuit have a common ground potential (46).

12. The arrangement according to claim 4,
in which the DC link (46, 52) and the low voltage at the output (46, 72) of the power supply circuit have a common ground potential (46).

13. The arrangement according to claim 2, further comprising
a semiconductor full bridge circuit (12) interconnecting an output of said DC link (52, 46) and at least one winding (11) of the electronically commutated motor (10).

14. The arrangement according to claim 3, further comprising
a semiconductor full bridge circuit (12) interconnecting an output of said DC link (52, 46) and at least one winding (11) of the electronically commutated motor (10).

15. The arrangement according to claim 4, further comprising
a semiconductor full bridge circuit (12) interconnecting an output of said DC link (52, 46) and at least one winding (11) of the electronically commutated motor (10).

16. The arrangement according to claim 5, further comprising
a semiconductor full bridge circuit (12) interconnecting an output of said DC link (52, 46) and at least one winding (11) of the electronically commutated motor (10).

17. The arrangement according to claim 7,
further comprising opto-couplers which control semiconductor switches (100, 102) disposed on a high-voltage side of the full bridge circuit (12).

18. The arrangement according to claim 7, further comprising
recovery diodes (100', 102', 104', 106') which are connected in antiparallel to semiconductor switches (100, 102, 104, 106) of the full bridge circuit (12), in order to permit operation of the motor (10) as a generator.

19. The arrangement according to claim 8, further comprising
recovery diodes (100', 102', 104', 106') which are connected in antiparallel to semiconductor switches (100, 102, 104, 106) of the full bridge circuit (12), in order to permit operation of the motor (10) as a generator.

* * * * *